United States Patent [19]

Eng et al.

[11] Patent Number: 4,574,379
[45] Date of Patent: Mar. 4, 1986

[54] SYNCHRONIZATION TECHNIQUE FOR NON-COLOCATED TV SIGNALS IN A TDMA SATELLITE COMMUNICATION SYSTEM

[75] Inventors: Kai Y. Eng, Cliffwood Beach; Barin G. Haskell, Tinton Falls, both of N.J.

[73] Assignee: AT&T Bell Laboratories, Murray Hill, N.J.

[21] Appl. No.: 505,099

[22] Filed: Jun. 16, 1983

[51] Int. Cl.$^4$ ............................................. H04J 3/06
[52] U.S. Cl. ...................................... 370/104; 455/12
[58] Field of Search ......................... 370/104; 455/12

[56] References Cited

U.S. PATENT DOCUMENTS

| | | | |
|---|---|---|---|
| 3,562,432 | 2/1971 | Gabbard | 179/15 |
| 3,646,444 | 2/1972 | Bitzer | 325/58 |
| 3,761,814 | 9/1973 | Bernasconi et al. | 325/4 |
| 3,878,339 | 4/1975 | Maillet | 179/15 |
| 3,982,075 | 9/1976 | Jefferis et al. | 179/15 |
| 4,004,225 | 1/1977 | Ganssmantel | 325/4 |
| 4,232,197 | 11/1980 | Acampora et al. | 370/104 |
| 4,302,838 | 11/1981 | Eng et al. | 370/100 |
| 4,320,503 | 3/1982 | Acampora | 370/104 |
| 4,346,470 | 8/1982 | Alvarez, III et al. | 370/104 |
| 4,470,093 | 9/1984 | Yamaura | 370/104 |

OTHER PUBLICATIONS

Proc. IEEE, vol. 65, No. 3, Mar. 1977, "Synchronization Methods for TDMA" by Nuspl et al, pp. 434–443.
IEEE Trans. on Comm. Technology, vol. COM-16, No. 4, Aug. 1968, "Design of a Satellite Time-Division Multiple-Access Burst Synchronizer" by Gabbard, pp. 589–596.

Primary Examiner—Douglas W. Olms
Assistant Examiner—Frank M. Scutch, III
Attorney, Agent, or Firm—Erwin W. Pfeifle

[57] ABSTRACT

The present invention relates to a technique for the synchronization of multiplexed television signals within each burst signals received at a remote station or satellite in a TDMA communication system from non-colocated ground stations. The technique employs a dynamic master/slave ground station arrangement where a first station signing on assumes the role of the master ground station. Other stations subsequently signing on synchronize their transmissions to the master station signal burst or the signal burst of the last station to sign on by using apparatus which monitors the received burst from the remote station, measures its own signal delay to the distant station and then phase-locks its local subcarrier clock to the master or last station's transmission burst. Dynamic transfer to the second station signing on occurs when the current master station terminates transmission for any reason.

9 Claims, 5 Drawing Figures

FIG. 2
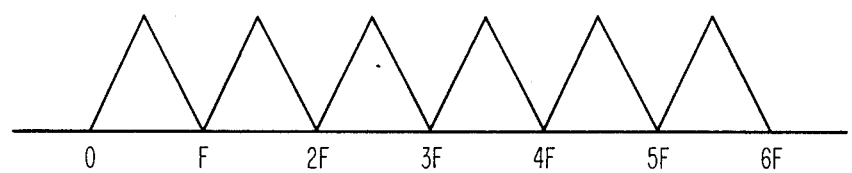
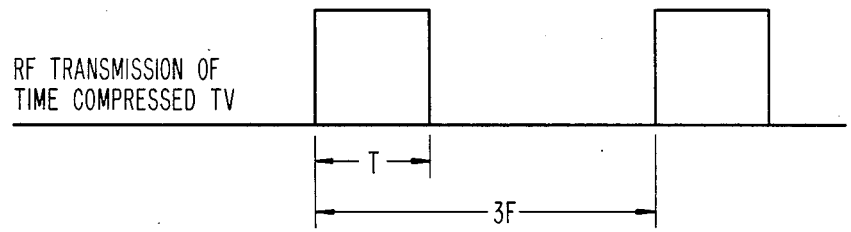

SYNCHRONIZATION TECHNIQUE FOR NON-COLOCATED TV SIGNALS IN A TDMA SATELLITE COMMUNICATION SYSTEM

TECHNICAL FIELD

The present invention relates to a technique for the synchronization of analog television signal transmissions received at a satellite from non-colocated TV signal sources using a Time Division Multiple Access (TDMA) mode. More particularly, the technique employs a dynamic master/slave arrangement where the first station signing on assumes the role of the master station and subsequent stations signing on synchronize their bursts to the master station's transmission burst with dynamic reassignment occurring when the current master station signs off.

BACKGROUND OF THE INVENTION

Various techniques have been developed for multiplexing analog television (TV) signals. Time Compression Multiplexing (TCM) is one such method where various signals are multiplexed by means of time compressing their analog waveforms into segments in such a way that the compressed segments from different sources can be sent on the same channel in separate time intervals known as time division multiplexing. Articles such as, for example, "TV Bandwidth Compression Techniques Using Time Companded Differentials and Their Application To Satellite Transmissions" by K. Y. Eng et al in BSTJ, Vol. 61, No. 10, December 1982 at pages 2917–2927 have discussed various properties and ways to implement TCM in the transmission of multiple TV signals through a single satellite transponder.

More recently, developments have been made available to permit three broadcast-quality TVs to be transmitted through a satellite transponder using either the TCM or a Time-Frequency Multiplexing (TFM) technique. With such TCM and TFM systems, one requirement is that the input TV signals be synchronized, at least to the extent that their vertical blanking intervals overlap. If the signals to be synchronized are colocated in the same uplink earth station, then frame synchronizers could be used. However, if such TV signals are to be transmitted from separate earth stations, then the uplinks have to be synchronized to ensure that the signal bursts from different sources would arrive at the satellite without overlap.

Synchronization techniques in communication satellite systems have been developed in the past years dealing primarily with digital TDMA applications. One such technique is disclosed in U.S. Pat. No. 3,646,444 issued to W. Bitzer on Feb. 29, 1972. There, a reference ground station transmits a fixed frequency reference signal which is received by every other ground station. Each of these other ground stations then uses the received reference signal to generate a separate local signal which is separately transmitted to the satellite and received back again by the originating ground station. The received local signal is then used to synchronize this other ground station. For other similar techniques, see for example, U.S. Pat. No. 3,562,432 issued to O. G. Gabbard on Feb. 9, 1971; U.S. Pat. No. 3,761,814 issued to G. Bernasconi et al on Sept. 25, 1973; U.S. Pat. No. 3,878,339 issued to W. G. Maillet on Apr. 15, 1975; U.S. Pat. No. 4,320,503 issued to A. Acampora on Mar. 16, 1982 and the article "Synchronization Methods for TDMA" by P. P. Nuspl et al in Proceeding IEEE, Vol. 65, No. 3, March 1977, at pages 434–443.

However, these previous synchronization techniques were designed for performance far exceeding the present requirement for synchronizing analog TV signals and hence tend to be more complicated than needed. More importantly, these techniques were meant for digital signals and are not suitable for analog TV where the color subcarrier and various sync pulses must bear strict phase and frequency relationships and thus cannot be advanced or retarded with respect to one another arbitrarily. Therefore, the problem, remaining in the prior art is to provide a simple synchronization technique for synchronizing analog TV signal transmissions at a satellite.

SUMMARY OF THE INVENTION

The foregoing problem has been solved in accordance with the present invention which relates to a technique for the synchronization of analog TV signal transmissions received at a satellite from non-colocated TV sources using a Time Division Multiple Access (TDMA) mode.

It is an aspect of the present invention to provide a technique for the synchronization of analog TV signals, such as, for example, multiple TV signals which have been combined for transmission using, for example, a Time Compression Multiplexing (TCM) technique, at least to the extent that the radio-frequency (RF) bursts from different sources would arrive at the satellite without overlap, where each burst relates in time to the duration, for example, of a TV field period.

It is a further aspect of the present invention to provide apparatus for synchronizing television burst signal transmissions from an earth station with burst signal transmissions from other non-colocated earth stations associated with a satellite transponder. More particularly, the apparatus comprises processor means and synchronizing apparatus, where the processor means is capable of detecting an existing time slot burst transmission within a frame period of a TDMA sequence by detecting the edge of a predetermined signal burst envelope. The synchronizing apparatus comprises a phase lock loop arrangement which includes an oscillator for generating a standard TV color subcarrier frequency, a synchronous generating means for generating standard TV line or field period timing signals which are in phase with the oscillator output signals, and phase detecting means which detects a difference in phase of the processor means and synchronous generating means output signals for appropriately canceling the detected phase difference by changing the phase of the oscillator.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 2 illustrates the Time-Compression processing of three successive TV signals from an earth station, where F=a field period and T=F minus a small guard time;

DETAILED DESCRIPTION

Figure 1:
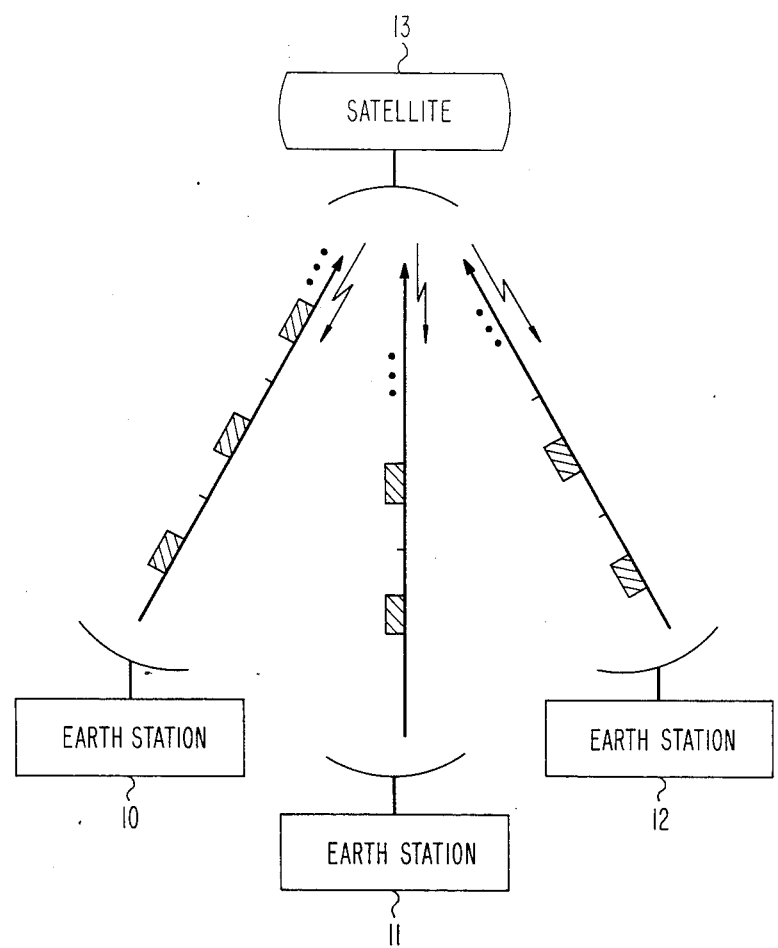
FIG. 1 is a block diagram of a typical satellite communication system with three spaced-apart earth stations capable of transmitting TV signal bursts.

A typical satellite system configuration wherein the present synchronization means can be employed is shown in FIG. 1, where three non-colocated uplink earth stations 10-12 are used to transmit their separate TV signals to a satellite 13. The TV picture signals are assumed hereinafter to be National Television Standards Committee (NTSC) signals and are to be, for example, time compressed with any suitable processing technique prior to transmission to permit Time Compression Multiplexing (TCM) to be employed. Therefore, it will hereinafter be assumed that each signal contains three fields of a TV picture signal which are time compressed into one field period F approximately equal to 1/60 sec. The resulting waveform of a time compressed TV signal contains three successive time compressed fields of picture information from a TV source followed by two field blanking periods as shown in FIGS. 1 and 2. The radio frequency (RF) transmission from each earth station will then consist of bursts, each having approximately one field duration, with two blank field periods as a separation between successive bursts from the same station. The synchronization problem, however, is to align these bursts from the three earth stations 10-12 so that they arrive at satellite 13 without overlap.

A system could be designed, at least in principle, such that the entire portion of the vertical blanking interval, approximately equal to 1.4 msec., within each TV burst is used for guard time. This would be sufficient to account for the diurnal drift of a satellite 13 itself. With the exact locations of stations 10-12 known, simple open-loop synchronization is then possible. The drawback of such approach is (1) that the deletion of the entire vertical blanking signal is undesirable in TV transmission because a variety of test signals and non-video information are frequently inserted in this time period, and (2) that the exact known location requirement for such earth station renders the scheme inflexible for the inclusion of transportable earth stations to cover, for example, specific events as is very prevalent today.

In a preferred embodiment of the present invention, the deletion of only a portion of a scan line, during vertical blanking involving approximately 15 usec., for interburst guard time is deemed sufficient and would not limit or interfere with picture performance. Additionally, each station need only know its own approximate location on earth to for example, within ±100 km, and need not know the location of any other station. This former assumption is not imposing since every station needs some location information for antenna pointing purposes.

To illustrate the operation of the present system, it will be assumed that station 10 is the first to transmit. Station 10 can do so at will because no other transmission is taking place, and its transmission is simply synchronized to its own NTSC TV clock. When station 11 is ready to start up after station 10 has been on the air, station 11 first monitors the arrivals of the RF bursts from station 10 and records their arrival times. It should be noted that station 11 does not have to demodulate station 10's signal; station 11 need only detect the RF pulses received. The RF bursts from station 10 occur in one out of three field periods as shown in FIG. 2, the period being perturbed mainly by the time varying propagation delay between stations 10 and 11 due to satellite 13 motion. Using these arrival times, station 11 can extrapolate, for the immediate future, arrivals of station 10's bursts. With the knowledge of its own approximate location on earth, station 11 can compute its propagation delay to satellite 13 with an accuracy better than ±1.2 msec., including satellite drift.

The estimate delay enables the translation of the arrival of station 10's bursts from the time reference at station 11 to that at satellite 13. Using this information, station 11 can then position the transmission of a narrow pulse so that it arrives at satellite 13 in a time window adjacent to a burst from station 10, but not interfering with it. This narrow pulse is then received back by station 11 and an actual delay measurement computed, done inband, between station 11 and satellite 13. Once the actual delay measurement is obtained, station 11 can derive a window signal, with a frequency approximately equal to one-third the TV field rate, that denotes the proper transmission times in order to maintain collision-free synchronization with station 10.

The derivation of this window signal at station 11 would mean the end of the problem if the system were arranged for digital transmissions. However, for TV applications the picture information cannot be arbitrarily advanced or delayed without regard to the phase and frequency relationships between its color subcarrier and its synchronization pulses. Therefore, in accordance with the present invention, frame or field synchronizing the TV picture at station 11 to a local color subcarrier clock which is in turn phase-locked to the aforementioned window signal in order to achieve proper transmission timing is proposed.

It is to be understood that throughout the above-described procedure of synchronizing station 11 to station 10, the uplink delay from station 10 to satellite 13 remains unknown to station 11. This is possible because the timing error of station 11's narrow pulse is small compared to the start-up time allotted, i.e., the field period. Subsequent synchronization is maintained by station 11 monitoring and updating the delay information and making adjustments accordingly. In this manner, station 10 is a master station by virtue of being the first station to transmit in the system, and station 11 is locked onto station 10 as a slave station.

When station 12 wishes to initiate transmissions, it has to go through the same procedure as station 11 did, except that station 12 would lock onto station 11's transmissions instead of station 10's transmissions. If station 10 ceases transmissions, station 11 would detect such occurrence and take over as master station using its own free running clock, and station 12 would stay locked onto station 11's transmissions. When station 10 wants to resume its transmissions later, station 10 has to join in as a slave station to station 12. Therefore, the system assumes a dynamic master/slave arrangement.

Figure 3:
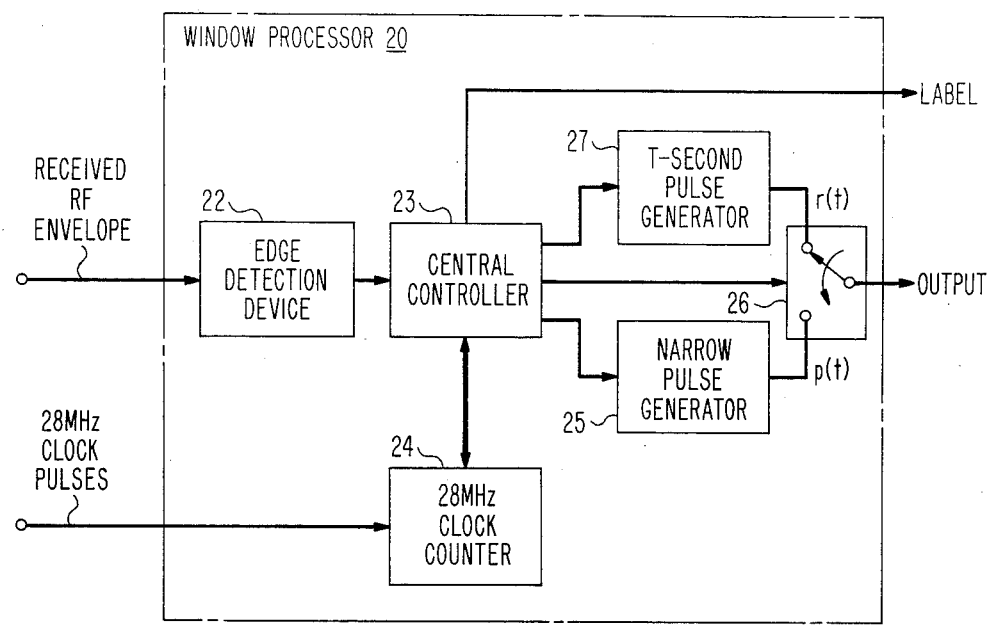
FIG. 3 is a block diagram of an exemplary Window Processor for use in the arrangement of FIG. 5.
Figure 5:
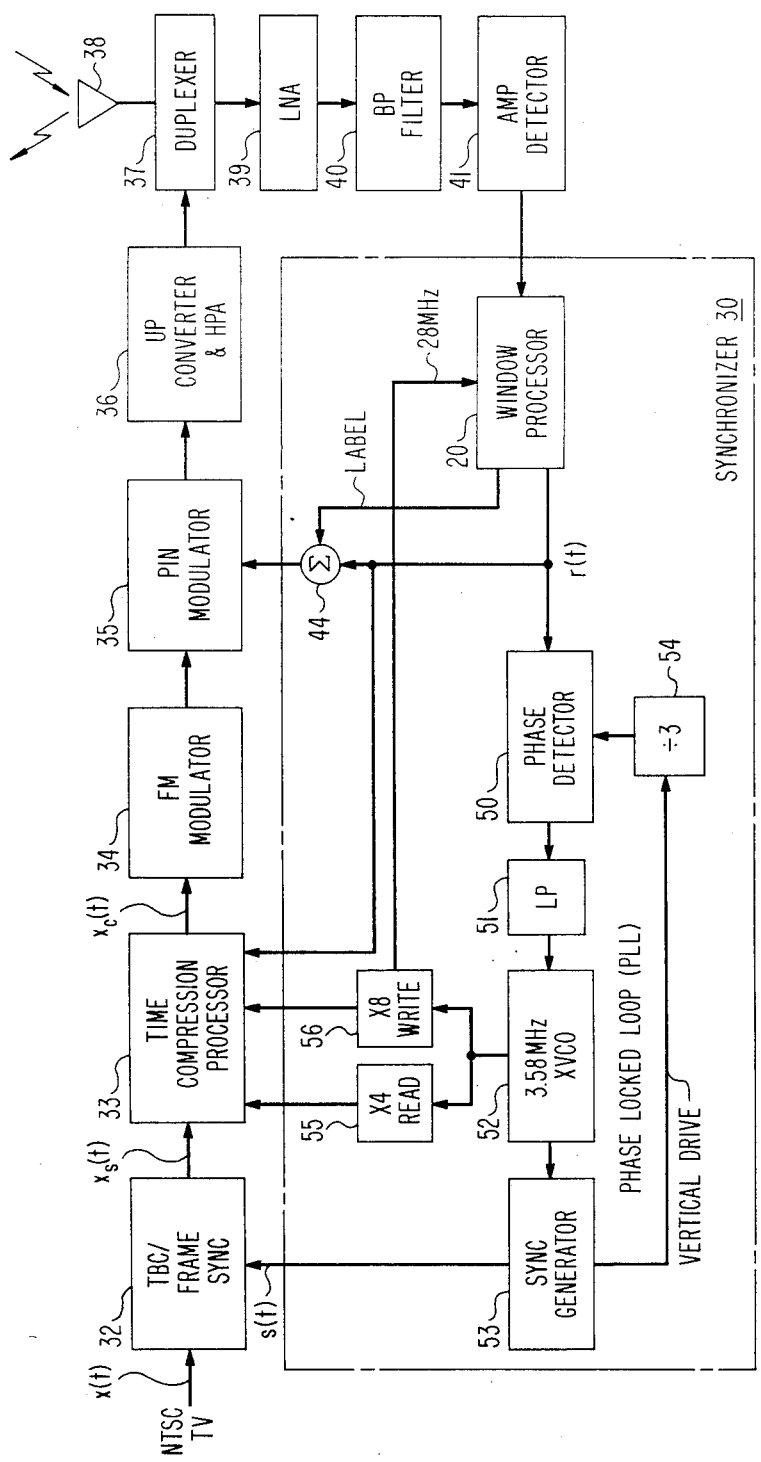
FIG. 5 is a block diagram for an earth station in accordance with the present invention employing the present method of synchronization.

A hardware implementation of the present method is shown in FIGS. 3 and 5 where the arrangement of FIG. 3 permits the generation of a window signal which marks the proper transmission time for the time-compressed TV bursts at a local earth station 10-12. FIG. 5 then provides an arrangement using the output signal from FIG. 3 to synchronize an incoming TV picture signal such that its time compressed bursts automatically align with the transmission windows for that station.

The window signal, hereinafter designated r(t), is a pulse train with a pulse width T equal to a TV field period minus the guard time and with a repetition rate equal to ⅓F, where again F=one field period. This window signal is generated by a window processor 20 having an exemplary arrangement as shown in FIG. 3. For purposes of discussion, it will be assumed that an external clock equal to 8 times the stations color subcarrier frequency is made available to Window Processor 20 of FIG. 3, which frequency is probably necessary for the time compression operation itself, and its generation, therefore, would not impose additional equipment on the system. For an NTSC color signal this frequency would be approximately 28 MHz. The other input to Window Processor 20 is the received RF envelope from the satellite 13 broadcast.

In the simple case of a station, i.e., station 10, being the first station to start transmissions, Window Processor 20 would do very little since the transmission is free running. The second station to start transmission receives the RF envelope of the first station's bursts from satellite 13. The received bursts enter edge detection device 22 which detects, for purposes of discussion hereinafter, the leading edge of each burst from the first station. With each detection of the leading edge of a burst, edge detection device 22 transmits a signal indicating such detection to a central controller 23. Central Controller 23 is responsive to the signal from edge detection device 22 for recording the count in clock counter 24 corresponding to the arrival time of the burst from the first station. It is to be understood that Central Controller 23 could be a microprocessor and/or hardwired logic for carrying out the windowing procedure as previously outlined.

After acquiring the initial arrival times of the bursts from the first station, central controller 23 makes a crude estimate of the future arrival times of a burst from the first station, which should be approximately 3 times a field period later. Furthermore, based on its location on earth, central controller 23 can compute, or have previously stored in a memory location, an approximate delay to the satellite 13. Putting all this information together, central controller 23 triggers a Narrow Pulse Generator 25 at a predetermined time to transmit a narrow pulse, p(t), via switching means 26, which is also under the control of central controller 23, to the transmitter shown in FIG. 5 and in turn satellite 13. This narrow pulse will arrive at satellite 13 well within a predetermined time slot without overlapping the first station's transmission.

The return of this narrow pulse from satellite 13 completes a round trip delay measurement by central controller 23 using the clock pulses of counter 24, to refine the arrival time estimates. After a few cycles of operation, the proper transmission time windows, r(t), can be established by generating sequences of pulses from a T-second Pulse Generator 27 to the transmitter of FIG. 5 with switching means 26 switched to the upper position. It is to be understood that the pulse width and repetition rate of these T-second pulses are both computed using the second station's 28 MHz clock. A representative signal of the transmission windows, r(t), is shown in the top waveform of FIG. 4.

Figure 4:
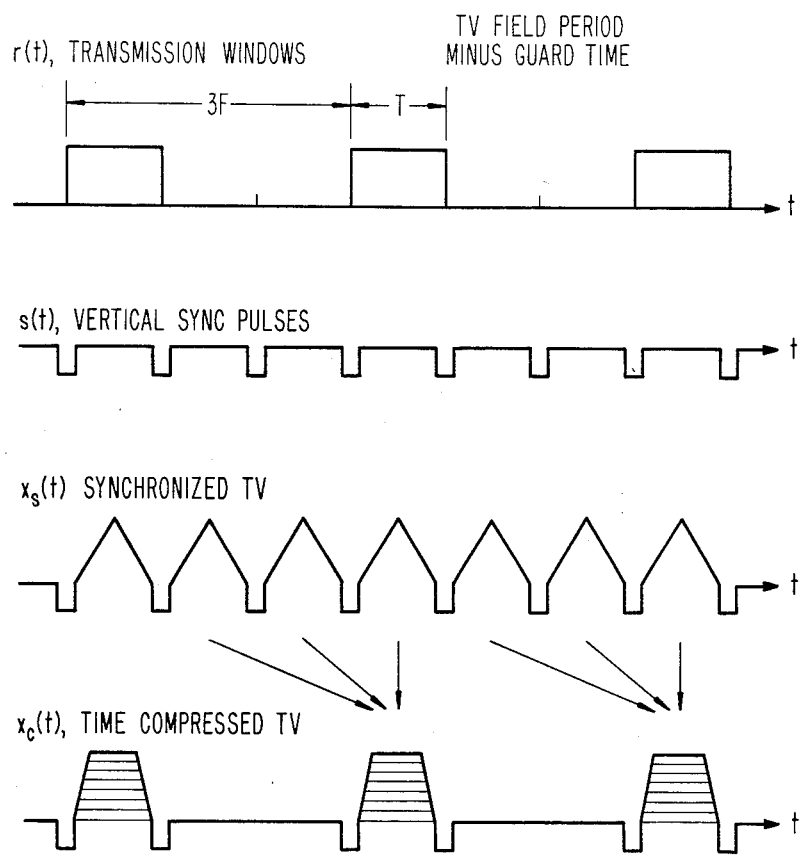
FIG. 4 is an illustration of the synchronization procedure in accordance with the present invention.

In FIG. 4, there is shown the conceptual sequence of operations needed to complete the synchronization. The transmission windows are established by waveform r(t) shown in the top waveform of FIG. 4. This waveform is used to align, or phase lock, a composite TV sync signal, s(t), shown in the second waveform of FIG. 4, such that every third vertical sync pulse in s(t) straddles the beginning of a transmission window r(t). The vertical sync pulses s(t) are then used to synchronize an incoming video signal, resulting in the synchronized TV signal $x_s(t)$ shown in the next to last waveform in FIG. 4. Finally the synchronized TV signal $x_s(t)$ can be time compressed to obtain the bottom waveform $x_c(t)$ shown in FIG. 4 which is in synchronism with the transmission windows.

Referring now to FIG. 5, which is a block diagram of an earth station employing the present method of synchronization, the TV signal x(t) is passed through a frame synchronizer and/or time base corrector, 32 whose reference signal s(t) is derived from the present synchronizer 30. The frame synchronizer 32 aligns x(t) to $x_s(t)$, shown in FIG. 4. The subsequent time compression of $x_s(t)$ is accomplished in a time compression processor 33, which can include random access memories (RAMs) which write a signal into memory at one speed and read the signal out of memory at a greater speed followed by multiplexers for combining the three time compressed signals into a field burst. For the present case, it will be assumed that Time Compression Processor 33 requires three clock inputs in addition to the incoming video signal $x_s(t)$: a 4X color subcarrier clock (approximately 14 MHz) for writing signals into memory, an 8X color subcarrier clock (approximately 28 MHz) for reading signals from memory, and the transmission window signal r(t).

The time compressed video signal $x_c(t)$ is now ready for immediate transmission through an FM modulator 34 and the rest of the system. The PIN modulator 35 shown after FM modulator 34 is included to ensure the proper transmission timing as well as to enable the transmission of the narrow pulses at start-up. An upconverter 36 then converts the time compressed and multiplexed signals to the proper microwave frequency for transmission to satellite 13 via, for example, a duplexer 37 and an antenna 38.

A return signal from satellite 13 is then received by antenna 38 and transmitted via duplexer 37 to a receiving section comprising, for example, a low noise amplifier 39, a bandpass filter 40, and an amplitude detector which in combination amplify the received signal, filter out unwanted signals and detect the RF received signal, respectively. The resultant signal from the receiving section is used as an input to synchronizer 30.

Referring now to Synchronizer 30, from the detected received RF pulses at the output of Detector 41, window processor 20, shown in greater detail in FIG. 3, generates either the proper transmission time windows, r(t), or the narrow pulses, p(t), depending on the state. The output from window processor 20 is transmitted to a combining means 44 where the output signal from window processor 20 is combined with a label generated by the window processor for transmission to PIN modulator 35 as will be explained in greater detail hereinafter. Additionally, the output of window processor 20 is transmitted to a phase locked loop arrangement comprising a phase detector 50, a low-pass filter 51, a voltage controlled oscillator 52 for generating a color subcarrier frequency, a sync generator 53 for generating the sync signal, s(t), shown in FIG. 4 from the output of oscillator 52 and a divider circuit 54.

When processor 20 is in a delay measurement mode, i.e., narrow pulses being generated, the rest of synchronizer 30 is free running. Once the proper transmission time windows, r(t), are generated, an internal 3.58 MHz color subcarrier is generated by voltage controlled oscillator 52 which is phase locked onto r(t) at the output of window processor 120 via TV Sync Generator 53 and an appropriate divider 54, here being a divide by 3 arrangement. The phase detector 50 detects any change in phase between the two input signals and generates a d-c signal which is passed by filter 51 and whose magnitude appropriately changes the frequency of oscillator 52 to provide the phase locked condition. This simple scheme ensures that the composite synch signal s(t) is synchronized with the transmission windows r(t).

The label output from window processor 20 causes, for example, short RF pulses to be generated in the guard time in order to distinguish the master station from the slave stations. More particularly, in any prudent system design, the possibility of failure of one channel should not disrupt in any way the transmissions of the remaining channels. In order to facilitate this, the present arrangement provides for a labeling mechanism in which the Window Processor 20 causes short RF pulses to be transmitted, for example, immediately following the video RF burst, i.e., at the beginning of the guard time.

These pulses are then used to distinguish the master station from the slave stations. For example, station 10, being the master station, could transmit three pulses. Station 11, being next in command, would send two pulses, and station 12 would then send one pulse. Additional pulses could identify the uplink station or, alternatively, this information could be embedded in the baseband video. The Window Processor 20 keeps track of time and labeling of all received RF bursts, and is ready to accommodate to any change in operating conditions. For example, if station 10 finishes its transmission and goes off-the-air, station 11 becomes the new master station transmitting three pulses, and station 12 becomes second in command transmitting two pulses.

It is never possible to predict all failure modes, and only the most likely ones can be accommodated. For example, a brief uplink failure will not be detected at any earth station (including, possibly, the faulty one) for about 240 msec., and during that time it is possible for transmission to resume. Moreover, corrective action by the faulty earth station will not be known to the remaining earth stations for another 240 msec. Thus, in the case of an uplink failure at master station 10, station 11 should not try to take over as master station immediately. If such condition were to occur, there would be the possibility of two master stations existing at the same time. In any event, as soon as the current master station determines that its uplink is unreliable, it should resign as the master station. This could be done by not transmitting any pulses following its video RF burst. The other stations would recognize this condition and assume the proper responsibilities, after which, if the original master station wished to begin transmitting again, it could transmit a single pulse designating itself the last station in command.

In the case of downlink failure, continued operation is not possible unless the faulty station is the master. If such station were not already the master, it could take over this role by sending, for example, four pulses following the video burst. The other stations would then recognize this condition and assume their proper responsibilities. In the case of an earth station momentary power failure, transmission would have to cease immediately and the start-up procedure reinvoked, since the Window Processor 20 would, in all probability, lose its timing information. Such restart could be speeded up considerably if non-volatile memory were provided.

Returning now to FIG. 5, the output from voltage controlled oscillator 52 is divided and passed through two multiplier circuits 55 and 56. Multiplier circuit 55 can, for example, multiply the output signal from oscillator 52 by a factor of four for use as a "write" signal for inputting the synchronized TV signals into, for example, RAMs which are read out at a higher speed to provide a compressed signal. The higher speed "read" signal would be provided by multiplier circuit 56 which, for example, could multiply the oscillator 52 output signal by eight to provide a 2-to-1 compression factor.

What is claimed is:

1. Apparatus for synchronizing television burst signal transmissions from a ground station to arrive at a distant station in a separate time slot of a time division multiple access (TDMA) sequence from other similar burst signals from other ground stations of a communication system, the apparatus comprising:

processor means (20) capable of detecting whether one or more existing time slot burst transmissions are received from the other ground stations within a frame period of the TDMA sequence and then generating an output window signal corresponding to either (a) a first time slot burst transmission period in the frame period of the TDMA sequence when no time slot burst transmissions from the other ground stations are detected, or (b) a next vacant time slot burst transmission period of the TDMA sequence when one or more existing time slot burst transmissions are detected, for use in transmitting the ground station's television burst signals to the distant station;

oscillator means (52) capable of generating a standard television color subcarrier frequency as an output signal;

synchronous generating means (53) responsive to the output signal from the oscillator means for generating standard television line or field period timing signals as an output signal which are in phase with the output signals from the oscillator means for aligning input television line or field signals, respectively, with synchronized time slot periods of the TDMA sequence;

means (32–35) responsive to the output signals from the synchronous generating means, the oscillator means and the processor means for transmitting a predetermined plurality of time compressed television line or field signals from a separate television program in each television burst signal; and phase detecting means (50) responsive to the output signals from the processor means and synchronous generating means for detecting a difference in phase between the two signals and for generating an output signal representative of such phase difference which will appropriately change the phase of the output signal of the oscillator means and, in turn, the output signal of the synchronous generating means to cancel said detected phase difference.

2. Synchronizing apparatus in accordance with claim 1 wherein the processor means comprises:
  means (23) for detecting an edge of the predetermined one of the existing time slot burst transmissions of each TDMA sequence and generating an output signal indicating when such edge was detected;
  a controller responsive to the output signal from the detecting means for generating predetermined output control signals; and
  pulse generating means responsive to the output control signals from the controller for generating output signals including said output window signals.

3. Synchronizing apparatus in accordance with claim 2 wherein said pulse generating means (a) is responsive to a first output control signal from the controller for generating a narrow pulse during the next vacant time slot period of the TDMA sequence during a start-up cycle when said ground station desires to start transmitting, and (b) is responsive to a second control signal from the controller for generating said output window signals during a transmission period of the ground station.

4. Synchronizing apparatus in accordance with claim 2 wherein the controller is responsive to the output signals from the detecting means for generating a predetermined separate label signal associated with each ground station for transmission in each television burst signal from the transmitting means for indicating where a ground station fits into a hierarchy for taking over from a master ground station should a previously assigned master station terminate transmission.

5. Synchronizing apparatus in accordance with claim 4 wherein the controller generates a first predetermined number of short pulses as a label signal when said ground station is a first or an earliest ground station to be in a transmission mode and is acting as a master ground station, and generates a second predetermined number of short pulses as a label signal when said ground station is a second or a next earliest ground station to be in a transmission mode and is acting as a second-in-command master ground station.

6. Synchronizing apparatus in accordance with claim 1 wherein the processor means is further capable of generating a predetermined separate label signal associated with each ground station to the transmitting means for transmission in each television burst signal, said label signal indicating where a ground station fits into a hierarchy for taking over from a master ground station should a previously assigned master station terminate transmissions.

7. Synchronizing apparatus in accordance with claim 1 wherein said oscillator means is a voltage controlled oscillator which is responsive to the output signal from the phase detecting means for appropriately changing the phase of the output signal of the oscillator means to synchronize the output burst signals from the transmitting means with said vacant time slot period.

8. Synchronizing apparatus in accordance with claim 1 wherein said apparatus further comprises:
  first multiplying means for generating an output signal comprising a first multiplied value of said standard television subcarrier frequency; and
  second multiplying means for generating an output signal comprising a second multiplied value of said standard television subcarrier frequency, and
  said transmitting means is responsive to said output signals from the first and second multiplying means for appropriately compressing and multiplexing a predetermined plurality of television line or field signals into each television burst signal.

9. Synchronizing apparatus according to claim 1 wherein the processor means comprises:
  means capable of transmitting a narrow pulse within the next vacant time slot period for transmission to the distant station, and
  means for detecting its return from the distant station and for generating the synchronized output window signals within the time slot periods of the TDMA sequence.

* * * * *